(12) United States Patent
Torres et al.

(10) Patent No.: US 6,213,186 B1
(45) Date of Patent: Apr. 10, 2001

(54) UNITARY CASSETTE ASSEMBLY WITH INTEGRAL PACKAGE TRAY

(75) Inventors: Daniel Torres, Fenton, MI (US); Marcel Aerts, Koersel; Steven VanLieshout, Winkelomseheide, both of (BE)

(73) Assignee: Irvin Automotive Products, Inc., Auburn Hills, MI (US)

( * ) Notice: Subject to any disclaimer, the term of this patent is extended or adjusted under 35 U.S.C. 154(b) by 0 days.

(21) Appl. No.: 09/320,915

(22) Filed: May 27, 1999

(51) Int. Cl.$^7$ ..................................... A47H 1/00
(52) U.S. Cl. ................... 160/24; 160/370.22; 296/37.16
(58) Field of Search .................. 160/23.1, 24, 323.1, 160/370.22; 296/24.1, 37.16; 312/292, 139.1

(56) References Cited

U.S. PATENT DOCUMENTS

| | | | |
|---|---|---|---|
| 1,376,506 | * 5/1921 | Beskin | 312/139.1 |
| 1,449,194 | * 3/1923 | Ross | 211/11 |
| 3,387,903 | * 6/1968 | Karlen | 312/292 |
| 4,277,097 | * 7/1981 | Lalanne | 296/37.16 |
| 4,335,773 | 6/1982 | Masi | 160/23.1 |
| 4,448,005 | 5/1984 | Vochelli | 52/473 |
| 4,579,385 | 4/1986 | Kienig | 297/184.12 |
| 4,671,557 | * 6/1987 | Lemp | 296/37.16 |
| 4,707,018 | 11/1987 | Gavagan | 296/152 |
| 4,758,041 | 7/1988 | Labeur | 296/152 |
| 4,783,113 | 11/1988 | Padlo | 296/136 |
| 4,979,775 | 12/1990 | Klose | 296/97.1 |
| 5,039,155 | 8/1991 | Suman et al. | 296/65.03 |
| 5,054,533 | 10/1991 | Lii | 160/302 |
| 5,064,238 | 11/1991 | Mohtasham | 296/97.6 |
| 5,135,279 | 8/1992 | Beatty | 296/97.1 |
| 5,202,332 | 4/1993 | Lii | 574/291 |
| 5,330,251 | 7/1994 | McGuire | 297/229 |
| 5,464,052 | * 11/1995 | Wieczorek et al. | . |
| 5,575,524 | 11/1996 | Cronk | 296/142 |
| 5,615,924 | 4/1997 | Owen | 296/95.1 |
| 5,630,460 | 5/1997 | Yuan | 160/310 |
| 5,638,884 | 6/1997 | Lin | 160/370.22 |
| 5,653,277 | 8/1997 | Kerner et al. | 160/370.22 |
| 5,655,810 | 8/1997 | Shikler | 296/136 |
| 5,676,415 | * 10/1997 | Ament et al. | 296/37.16 |
| 5,685,592 | * 11/1997 | Heinz | 296/37.16 |
| 5,687,786 | 11/1997 | Tsai | 160/370.21 |
| 5,694,998 | 12/1997 | Chen | 160/370.21 |
| 5,813,449 | * 9/1998 | Patmore et al. | 296/37.16 |
| 5,813,450 | 9/1998 | Yang | 160/370.23 |
| 5,816,310 | 10/1998 | Wu | 160/370.21 |
| 5,896,910 | 4/1999 | Chen | 160/370.22 |
| 5,947,358 | * 9/1999 | Wieczorek | 296/37.16 |
| 5,961,172 | * 10/1999 | Ament et al. | . |

* cited by examiner

*Primary Examiner*—Blair M. Johnson
(74) *Attorney, Agent, or Firm*—Dinnin & Dunn, P.C.

(57) ABSTRACT

The present invention comprises an integrally formed cassette and package tray and end cap which at least partially encloses a security shade roller and a gap between the roller and the rear seat of a motor vehicle.

5 Claims, 2 Drawing Sheets

UNITARY CASSETTE ASSEMBLY WITH INTEGRAL PACKAGE TRAY

BACKGROUND OF THE INVENTION

The invention pertains to a container or cassette for covering an automotive security shade. A security shade or accessory cover apparatus are often provided in automobiles that do not have discreet self contained luggage compartments such as trunks or boots. These shades selectively cover or expose the otherwise open vehicle cargo compartment. Such shades or covers serve as a security curtain to conceal luggage or other objects carried in the rear compartment of a hatchback, station wagon, sport utility vehicle, passenger van, pickup truck or similar type vehicle wherein the contents of such a cargo compartment would otherwise be in plain view.

Various cover or security curtain apparatuses for vehicle cargo compartments known in the art such as those disclosed in U.S. Pat. Nos. 4,139,231; 4,222,601; 4,502,674; 4,479,677; 4,482,137, for example, all of which are owned by Irvin Automotive Products, Inc. the assignee of the present invention, and the disclosures of which are incorporated by reference herein. The various cover apparatuses and components disclosed and claimed in these United States patents have performed well and have provided an effective barrier for concealing the contents of a vehicle compartment.

These covers generally comprise a biased roller member suspended behind the rear seat of the vehicle at approximately the height of the rear seat. Typically, the roller member is spring loaded between brackets mounted on, or pockets formed in, the interior side panels of the vehicle, the biasing force of the spring keeping the roller in place, but relatively easily overcome to enable the ready removal or insertion of the roller. A fabric panel is wound upon the roller and can be unwound to cover the luggage compartment, stretched between the roller and the rearward edge of the compartment. When released, the roller member is biased by a motor spring or a torsion spring to rotate to wind the panel back onto the roller. One or more floating end caps may be provided to allow the roller to self-center relative to the sidewalls to ensure centering of the panel and thus efficient covering of the luggage compartment. Changes in vehicle interior designs and configurations, including the recent provision of shoulder harness retention belts for rear seat passengers, necessitated the provision of clearance between the cover apparatus and the rear side of a rear seat assembly, thus creating a gap that must be filled in order to effectively obscure the contents of the compartment from view. This gap also creates an incongruity in the aesthetic appearance of the cover.

There have been a variety of approaches to provide a "gap hiding" roller assembly, most notably the device disclosed in U.S. Pat. No. 4,776,625 to Lobanoff, et al, owned by the assignee of the present invention, the disclosure of which is incorporated by reference herein. Lobanoff provides a cassette assembly held within end caps which are mounted to lateral tabs of mounting brackets, and also provides an enclosure member interconnected to the cassette and/or end caps to define a sub-compartment. Lobanoff also provides a cover member for the sub-compartment pivotally connected along a pivot rod connected between the end caps.

It is the object of the present invention to provide an aesthetically effect, a simple and consistent construction and assembly now required of modern modular automotive assembly, and a greater degree of containment than provided by the existing designs. In particular, it is preferred that the cassette assembly completely enclose the cover roller assembly. It is easier for the vehicle owner to handle a rigid elongated container than a roller assembly of a flexible cover wound into a shaft, thus facilitating installation, removal and storage. Ease of use has become a critical issue to automotive manufacturer, particularly for accessory laden (and high profit) vehicles such as luxury sport utility vehicles. Further, enclosing the roller assembly greatly reduces the risk of items being wound into the roller such as children's fingers or loose articles, thus improving safety and convenience. Further still, enclosing the roller assembly provides a more aesthetic appearance and a fixture that is much easier to maintain. The cassette keeps the cover panel dust free when in the rolled position and also protects the cover panel from spills and the like.

Another prime concern with respect to automotive accessories is simplicity of construction or assembly. As labor costs rise, reduction of the amount of labor becomes even more important. Reduction of assembly labor also reduces the automotive manufacturers' dependance upon the labor force to meet production schedules. Reducing the number of parts also reduces the risk of error in assembly which improves safety.

The appearance of the entire assembly is critical, as automobile purchasers have grown to expect a "polished" consistent appearance throughout the automobile. The color composition and texture of trim should be consistent throughout the vehicle, which requires suppliers of automotive accessories to use utility compatible plastics and upholstery to match the vehicle interior.

It is also desirable to make the best use of the vehicle cargo space and to provide as much storage as possible and to assist the vehicle owner to most conveniently and securely stow cargo in the luggage compartment. Therefore, it is preferred to provide a readily accessible cargo or package tray readily accessible from the rear seat and having a tray cover concealing the contents from view while preserving the congruity of the appearance of the vehicle interior. It is also preferred to provide brackets for securing articles within the luggage compartment. This is particularly pertinent with respect to flimsy plastic bags with cut-out handle openings such as those commonly distributed at grocery stores. The heavy gauge paper grocery bags that were predominate in early years would provide some structural support for their contents, allowing a vehicle owner to arrange the paper bags within the luggage compartment relatively securely. In contrast, the flimsy plastic bags offer little if any support and typically disgorge their contents even under moderate driving conditions. Hooks or brackets allow the vehicle owner to hang bags such as the plastic grocery bags to secure them in the luggage compartment and prevent their contents from spilling into the luggage compartment. The hooks or bracket also provide anchoring points for securing various cargo such as with twine or elastic cords (bungee cords).

Therefore, the present invention seeks to provide a vehicle compartment cover apparatus that is relatively simple and inexpensive to manufacture and install, and that provides a relatively close-fitting barrier or security curtain, while accommodating the provision of rear seat shoulder harnesses or other vehicle interior design parameters requiring clearance adjacent a rear seat assembly or other vehicle interior components, and provides an additional storage area readily accessible to passengers in the rear seat.

According to the present invention, a cover apparatus for selectively covering or exposing an open vehicle compartment includes a mounting assembly adapted to be interconnected with the vehicle for mounting and supporting the roller apparatus generally adjacent the compartment opening at a longitudinal position generally between the longitudinally-spaced compartment ends. The roller apparatus includes a flexible cover panel interconnected with the mounting assembly and extending laterally across the compartment opening. The cover panel is selectively movable between a longitudinally retracted position and a longitudinally extended position, preferably by way of a roll up mechanism such as that described in the above-mentioned United States patents, with the cover panel extending generally between the mounting assembly and one of the compartment ends when in its extended position. The cover panel is also releasably attachable to the compartment end, or to a hatchback door, in order to releasably retain the cover member in its extended position.

SUMMARY OF THE INVENTION

The present invention comprises an integrally formed cassette and package tray and end cap which at least partially encloses a security shade roller and a gap between the roller and the rear seat of a motor vehicle. The cassette assembly further includes a floating end cap to facilitate insertion or removal of the cassette from the motor vehicle, a cover member which substantially completely encloses the roller member and which provides a hinged cover for the package tray, and an end cap cover member which is easily installed to hold the entire assembly. The cassette assembly is relatively lightweight but rigid, and supports utility hooks integrally formed therein.

DETAILED DESCRIPTION OF THE PREFERRED EMBODIMENT(S)

Figure 1:
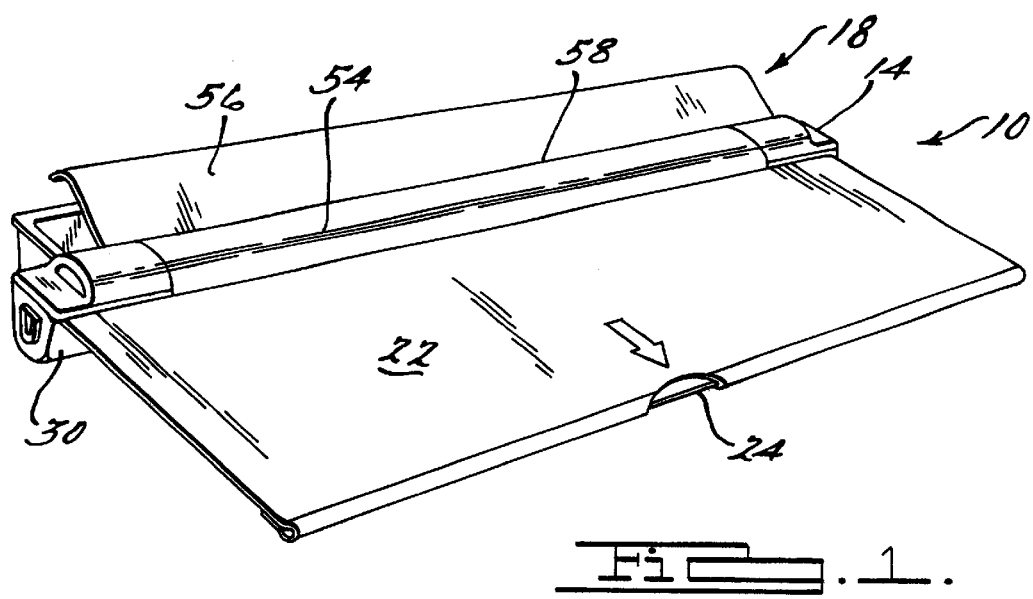
FIG. 1 is a perspective view of a cassette assembly according to the present invention.
Figure 2:
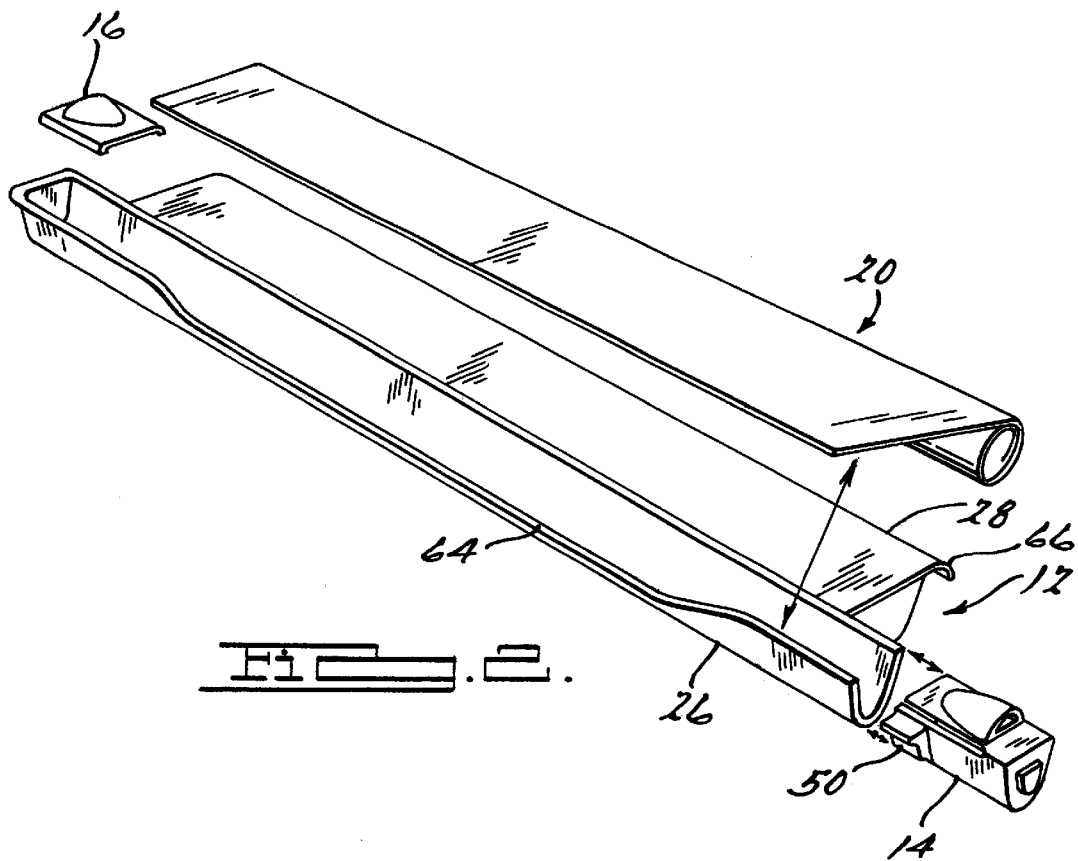
FIG. 2 is an exploded perspective view of a portion of the cassette assembly of FIG. 1.

FIGS. 1 and 2 illustrate a cassette assembly 10 according to the present invention which includes a cassette body 12, a floating end cap 14, an end cap cover 16, and a cassette cover 18. A shade roller 20 is contained within the cassette body 12, and includes a shade panel 22 which is selectively extended (in the direction indicated by the arrow) or retracted into a storage condition rolled onto the roller assembly. The shade panel 22 is shown in a partially extended condition.

In usage, the cassette assembly is mounted in an automobile behind the rear seat and between the interior side trim panels. The shade panel 22 can be extended by grasping the handle 24 and pulling toward the rear of the vehicle. Various shade panels and roller assemblies are known in the art as described above. Although various shade rollers can be utilized, it is preferred that the roller be a self centering roller with a suitable biasing force urging the shade to a rolled up condition. It should be appreciated that the planar rectangular panel and simple cut-out handle at the reinforced edge is currently most typical, but that variety of shade panel configurations and handles would work in combination with the present invention.

The cassette body 12 is formed as a single piece, preferably by injection molding, from a plastic comparable to the plastic trim pieces of the vehicle interior. The body 12 includes a shade well 26, a package well 28 and a fixed end cap portion 30. As these portions are integrally formed, assembly of these portions is avoided and a greater structural integrity is achieved while maintaining a relatively low weight.

Figure 3:
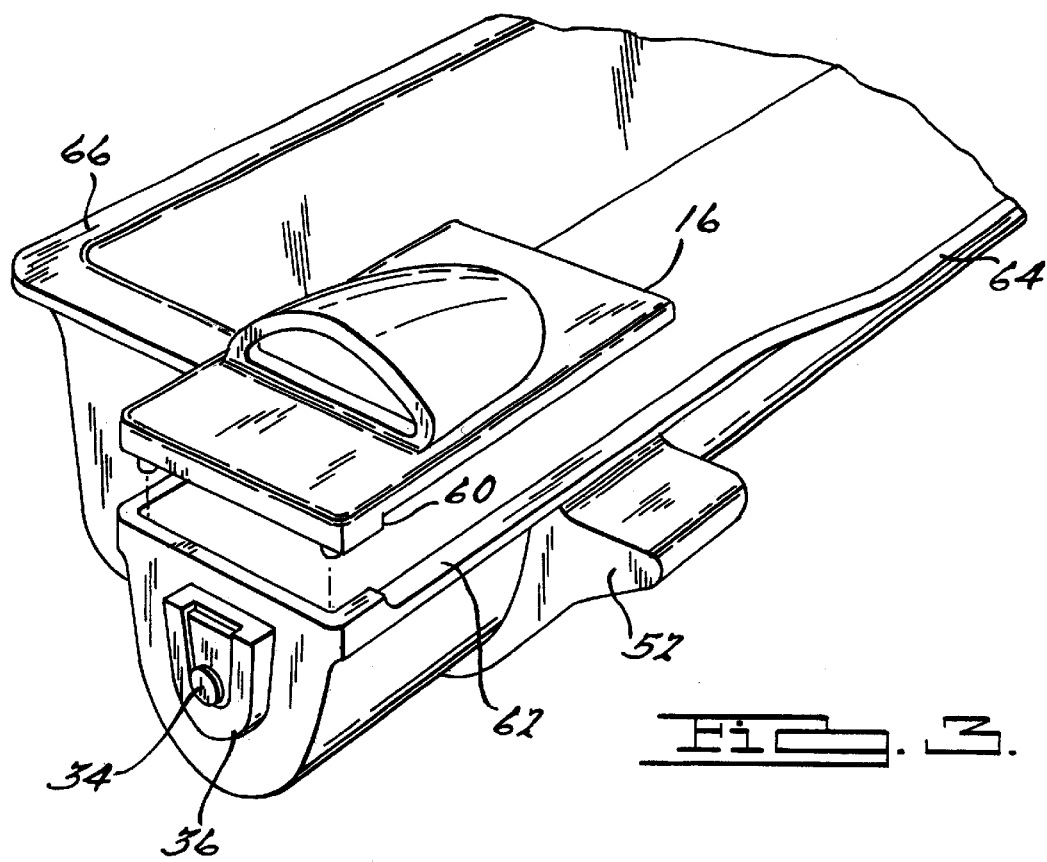
FIG. 3 is an exploded perspective view of the left end of the portion of the cassette assembly of FIG. 2.
Figure 4:
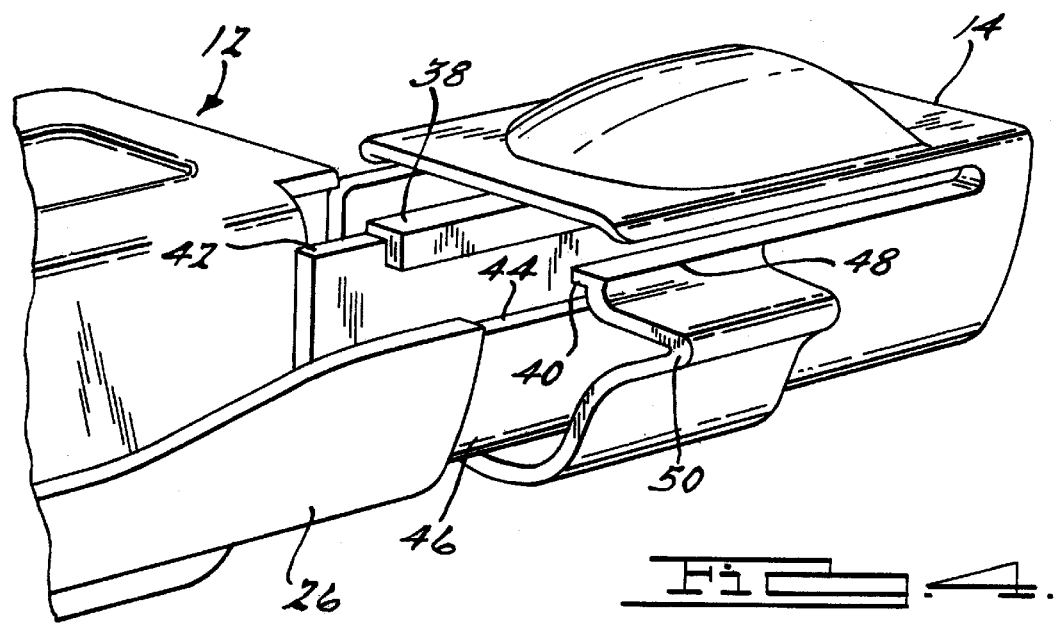
FIG. 4 is an exploded perspective view of the right end of the portion of the cassette assembly of FIG. 2.

The shade roller 20 is held between the end cap 30 and floating end cap 14 by a compression fit, the roller 20 compressible to allow ends of an axle or separate aligned spindles to be inserted into an aperture 34 in the end cap 30 and a similar aperture in the exterior wall of the floating end cap 14. As shown in FIG. 3 the end caps 30 and 14 may each by provided with an integrally formed bracket 36 which mates with a corresponding female bracket member formed within the interior side trim panels of the vehicle. The receiving bracket may be formed within a shallow depression shape to receive the end wall of the end caps, which restrict rotational movement of the cassette during winding or unwinding of the roller shade. As shown in FIG. 4, the floating end cap 14 is free to travel along the axis of the shade well 26, which provides the axial play required to install or remove the cassette assembly. The floating end cap 14 separately formed and provided with guide rails 38 and 40 which ride upon the top edges 42 and 44 of the cassette extension 46. The floating end cap 14 may be biased axially outwardly by the motor spring of the roller assembly. Alternatively, the floating end cap 14 may be biased axially outwardly by a spring nested between the end wall of the cassette extension and the end wall of the floating end cap 14. The floating end cap is provided with a shade slot 48 which aligns with the gap intentionally formed when the remaining elements are assembled. The floating end cap may also be formed with a utility hook or grocery bag hanger as shown at 50. Multiple hooks or hangers can also be provided along the length of the cassette such as shown at 52.

The cassette cover 18 includes a cassette cover panel 54 and a tray cover panel 56. The cassette cover panel 54 contains an interior rigid panel such as plastic or cardboard but preferably metal, and the tray cover panel contains a rigid but light interior panel such as plastic but preferably cardboard. The respective interior panels are upholstered together with a suitable material to match the vehicle interior, such as vinyl. A scam 58 is created between the panels 54 and 56, such as by welding the vinyl material. This seam retains the interior panels in a fixed relationship and acts as a hinge for the tray cover 56. As shown in FIG. 1, the cover panels 54 and 56 may be formed with a curved or other stylistic profile to enhance the appearance of the assembly.

Once the roller 20 is inserted into the shade well 26, the cassette cover 18 is installed by inserting an end of the cassette cover panel 54 into the raised portion of the floating end cap 14. The raised portion of the end cap 14 is formed to receive the end portion of the desired cassette cover panel profile. The other end of the cassette cover panel 54 is held in place by fastening the end cap cover 16 to the fixed end cap 30, which can be accomplished by known fasteners such as screws, compressible tangs or tabs and slots or the like. The end cap 30 has a recessed portion 60 which cooperates with a mating portion 62 of the cassette body 12 to form a slot for the shade panel 22 aligned with the shade slot 48. The shade well 26 is preferably formed with a rearwardly extending and slightly depressed edge 64 to form a continuous shade slot and leading edge for the extension and retraction of the shade panel 22.

The package well 28 is formed with a rounded lip 66 which abuts the back of the rear seat of the vehicle. Such seats are typically capable of being folded down to create extra storage space, so the rounded lip 66 reduces wear of the fabric of the seat back when the seat is repositioned and distributes the compression force against the seat back over the curved surface which reduces any indentation marks may tend to be created in the seat back. The package well 28 is approximately as deep as the shade well 26, which is deep enough to accommodate a variety of automotive accessories such as tools, maps and the like or family items such as books, toys, games or food, and still be covered by the panel 56, concealing the contents from view but leaving them readily accessible from the rear seat.

The foregoing discussion and the illustrations in the accompanying drawings disclose and describe merely exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. A cassette assembly supporting a shade roller in a horizontal position, said cassette assembly comprising:

a first elongated U-shaped trough substantially enclosing said shade roller;

a second elongated generally U-shaped trough having an upwardly facing opening, said troughs having a mutual side wall; and an elongated segmented cover having a first elongated rigid panel disposed and captively held on said first trough, and a second elongated panel hingedly held adjacent to said first panel pivotally disposed to cover said second trough.

2. A vehicle roller shade assembly comprising:

an elongated cassette having a fixed end wall and an opposing floating end wall, and an elongated side wall;

a roller assembly having a pair of distal axially aligned spindles biased apart from each other, one of said spindles engaging said fixed end wall and the other of said spindles engaging said floating end wall and biasing said floating end wall away from said fixed end wall;

an elongated storage tray substantially the length of said cassette having an elongated wall common with said side wall of said cassette; and an elongated segmented cover, said cover having a first elongated rigid panel disposed between and captively held by said end walls, and a second elongated panel hingedly held adjacent to said first panel pivotally disposed to cover said storage tray.

3. The vehicle roller shade assembly of claim 2 further comprising a plurality of utility hooks integrally formed on said cassette.

4. The vehicle roller shade assembly of claim 3 wherein one of said utility hooks is located on said wall.

5. A vehicle roller shade assembly comprising:

a roller shade;

an elongated cassette substantially covering said roller shade and having an outlet along one elongated side thereof, and an elongated storage compartment substantially the same length as said cassette adjoining said cassette on the side opposite said outlet;

said cassette having an elongated segmented cover, said cover having a first elongated rigid panel fixed to said cassette and a second elongated panel hingedly held adjacent to said first panel pivotally disposed to cover said storage compartment.

* * * * *

UNITED STATES PATENT AND TRADEMARK OFFICE
CERTIFICATE OF CORRECTION

PATENT NO. : 6,213,186 B1
DATED : April 10, 2001
INVENTOR(S) : Torres et al.

Page 1 of 1

It is certified that error appears in the above-identified patent and that said Letters Patent is hereby corrected as shown below:

Title page,
Please add Patent No. 4,567,491 1/1986 Lawrence to references cited.
Please correct inventors name in references cited for U.S. Patent No. 4,579,385 delete "Kienig" and insert -- Koenig --.

Column 4,
Line 33, please delete "by" and insert -- be --.
Line 66, please delete "scam" and insert -- seam --.

Signed and Sealed this

Twenty-seventh Day of November, 2001

Attest:

NICHOLAS P. GODICI
Attesting Officer
Acting Director of the United States Patent and Trademark Office